United States Patent
Frey et al.

(10) Patent No.: US 6,456,156 B1
(45) Date of Patent: Sep. 24, 2002

(54) METHOD AND DEVICE FOR THE OPEN-LOAD DIAGNOSIS OF A SWITCHING STAGE

(75) Inventors: Michael Frey, Erfurt; Stefan Haimerl; Dieter Sass, both of Regensburg; Mario Seifert, Lengenfeld, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/011,876

(22) Filed: Nov. 5, 2001

Related U.S. Application Data

(63) Continuation of application No. PCT/DE00/01406, filed on May 4, 2000.

(30) Foreign Application Priority Data

May 4, 1999 (DE) .......................... 199 20 465

(51) Int. Cl.[7] .................. G05F 1/10; H03K 17/687
(52) U.S. Cl. .................. 327/541; 327/74; 327/427; 327/108
(58) Field of Search .................. 327/540, 541, 327/543, 538, 427, 434, 108, 109, 112, 74, 75, 76, 77, 78; 361/91.3, 88, 91.1

(56) References Cited

U.S. PATENT DOCUMENTS

| | | | |
|---|---|---|---|
| 5,438,286 A | | 8/1995 | Pavlin et al. .................. 327/50 |
| 5,570,060 A | * | 10/1996 | Edwards .................. 327/540 |
| 5,895,989 A | | 4/1999 | Imaizumi et al. .......... 307/139 |
| 6,215,338 B1 | * | 4/2001 | Gervasi et al. ............. 327/108 |
| 6,229,383 B1 | * | 5/2001 | Ooishi .................. 327/540 |
| 6,281,744 B1 | * | 8/2001 | Kang .................. 327/541 |
| 6,356,140 B1 | * | 3/2002 | Bell .................. 327/112 |

FOREIGN PATENT DOCUMENTS

| | | |
|---|---|---|
| DE | 40 20 187 C2 | 1/1991 |
| DE | 197 05 339 A1 | 8/1998 |
| EP | 0 743 529 A1 | 11/1996 |

* cited by examiner

*Primary Examiner*—Toan Tran
(74) *Attorney, Agent, or Firm*—Laurence A. Greenberg; Werner H. Stemer; Gregory L. Mayback

(57) ABSTRACT

A method and a device for an open-load diagnosis of a switching stage includes the steps of turning off the switching transistor if, after a first delay time has elapsed since an appearance of a control signal, the output voltage is less than a first reference voltage, and if, after a second delay time has elapsed, the output voltage is less than a second reference voltage, then, with the switching transistor in the on state again, comparing the output current flowing through the switching transistor with a reference current, and if the output current is less than the reference current, effecting an open-load indication. The device includes a switchable buffer amplifier; a switching transistor, second and third transistors, a reference current source, first and second comparators, and a control circuit connected to the buffer amplifier, to the second and third transistors, and to the first and second comparators.

12 Claims, 2 Drawing Sheets

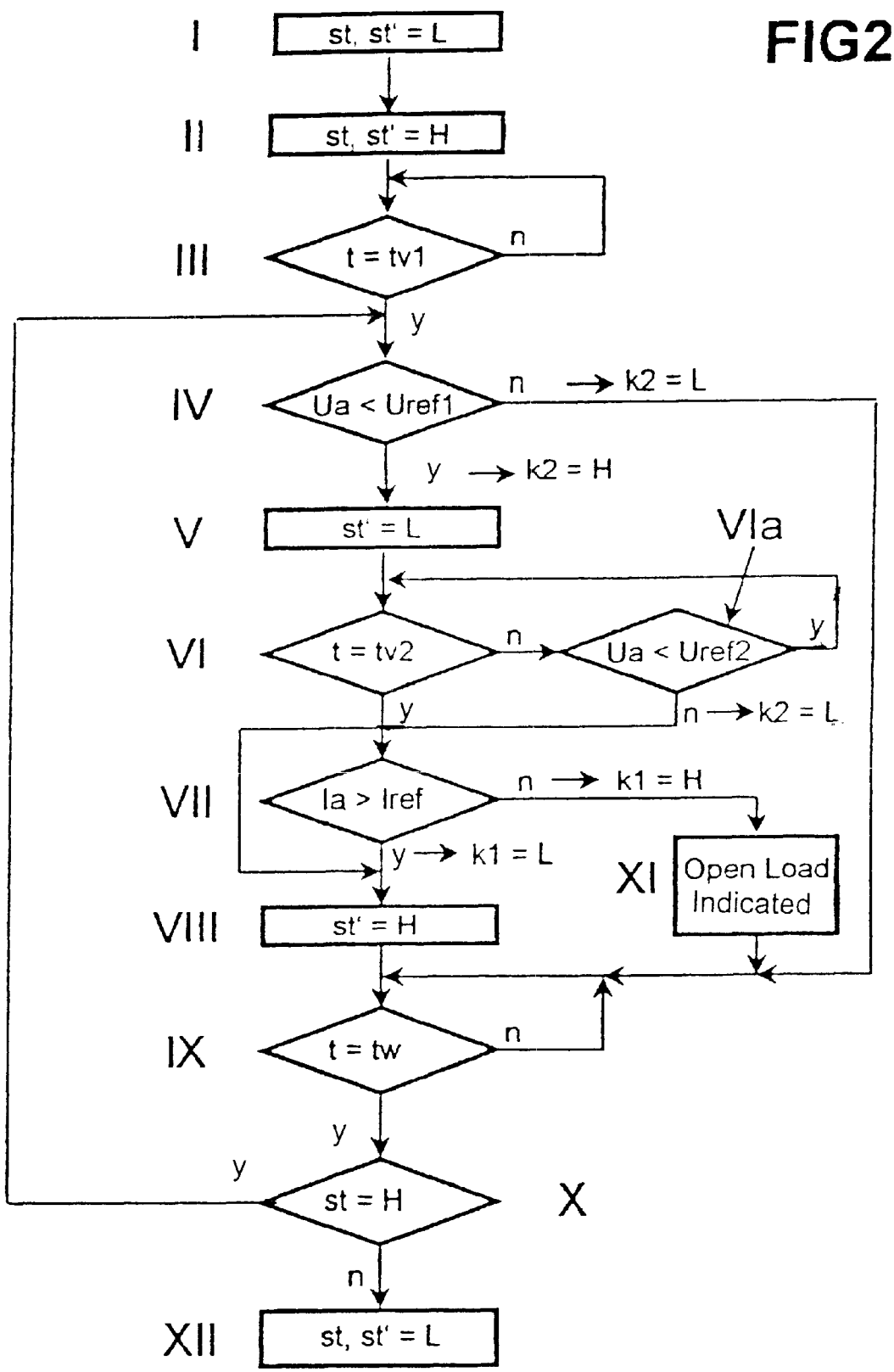

METHOD AND DEVICE FOR THE OPEN-LOAD DIAGNOSIS OF A SWITCHING STAGE

CROSS-REFERENCE TO RELATED APPLICATION

This application is a continuation of copending International Application No. PCT/DE00/01406, filed May 4, 2000, which designated the United States.

BACKGROUND OF THE INVENTION

Field of the Invention

The invention relates to a method for the open-load diagnosis of a switching stage having a load connected in series with at least one switching transistor and to a device for carrying out the method.

In motor vehicle electronics, loads, for example, ignition coils or fuel injection valves, are increasingly being switched by electronic output stages, the output stage being disposed as near as possible to the load and being driven with small switching currents and voltages in order to avoid interference pulses from a driver switching stage that is disposed in a control unit and to which it is connected through cables (wiring harness). In the case of such a switching stage, an open-load diagnosis (testing for a line break) is intended to be carried out, where the intention is to fulfill the following boundary conditions:

a) the open-load diagnosis must be carried out online, i.e., during active operation, at least cyclically;

b) a large ratio (factor greater than 100) of maximum load current and open-load identification threshold (reference current) in the case of a small permissible voltage drop across the switching transistor (DMOS or MOSFET switch);

c) the open-load diagnosis must be carried out such that the permissible voltage drop across the output stage switch is not exceeded;

d) a high accuracy of the identification threshold with regard to process fluctuations when the switching stage is embodied as an integrated circuit;

e) the charge of the load capacitance at the output of the output stage switch (wiring harness capacitance) must be rapidly reversed when the switch is activated;

f) the solution must be suitable for cost-effective mass production. German Published, Non-Prosecuted Patent Application DE 40 20 187 C2, corresponding to U.S. Pat. No. 5,144,514 to Sekigawa et al., discloses a drive circuit for a load using a transistor device with a main transistor and a measuring transistor in parallel with the measuring transistor. A shunt resistor is connected in series with the measuring transistor. After the two transistors have been switched on, they are both switched off again if, after a predetermined delay time, the voltage dropped across the shunt resistor exceeds a predetermined reference value.

SUMMARY OF THE INVENTION

It is accordingly an object of the invention to provide a method and device for the open-load diagnosis of a switching stage that overcomes the hereinafore-mentioned disadvantages of the heretofore-known devices and methods of this general type and that fulfills the above-mentioned boundary conditions.

With the foregoing and other objects in view, there is provided, in accordance with the invention, a method for an open-load diagnosis of a switching stage, including the steps of providing a switching stage having a load connected in series with at least one switching transistor, defining a predetermined first delay time period, starting a count of the first delay time period upon receipt of a control signal, waiting for the first delay time period to elapse, subsequently comparing an output voltage across the switching transistor with a predetermined first reference voltage, and terminating the open-load diagnosis and maintaining a driving of the switching stage until an end of the control signal where the output voltage is greater than the predetermined first reference voltage, and turning off the switching transistor and starting a count for a predetermined second delay time period where the output voltage is less than the predetermined first reference voltage, during the course of the second delay time period, comparing the output voltage with a predetermined second reference voltage, and, where the output voltage is greater than the predetermined second reference voltage terminating the open-load diagnosis, turning on the switching transistor again, and maintaining the driving of the switching stage until the end of the control signal, where the output voltage is less than the predetermined second reference voltage after the second delay time period has elapsed, comparing one of an output current flowing through the switching transistor and a voltage proportional to the output current with at least one of a predetermined reference current and a voltage proportional to the predetermined reference current, and terminating the open-load diagnosis and maintaining the driving of the switching stage until the end of the control signal where the output current is greater than the predetermined reference current, and effecting an open-load indication where the output current is less than the predetermined reference current, and repeating the open-load diagnosis from an end of the first delay time period until the end of the control signal after a predetermined waiting time period has elapsed.

In accordance with another mode of the invention, an optical indication identifying an open-load case through an indication signal is activated.

In accordance with a further mode of the invention, an entry identifying an open-load case is made in a diagnosis memory as a result of the indication signal.

With the objects of the invention in view, there is also provided a device for diagnosing an open-load of a switching stage, including a switchable buffer amplifier, a switching transistor having a drain-source path, the switching transistor to be controlled by control signals through the switchable buffer amplifier, a second transistor having a gate terminal, a source terminal, and a drain-source path connected in parallel with the drain-source path of the switching transistor, the second transistor to be controlled by the control signals, a third transistor having a gate terminal and a source terminal each connected to a respective one of the gate terminal and the source terminal of the second transistor, the third transistor to be controlled by the control signals, a reference current source connected to the drain terminal of the third transistor, a first comparator having two inputs and a first comparator output, one of the inputs connected to the drain terminal of the third transistor and another of the inputs connected to the drain terminal of the second transistor, the first comparator supplying an output signal at the first comparator output, a second comparator having two inputs and a second comparator output, one of the inputs connected to the drain terminal of the second transistor and another of the inputs receiving predetermined reference voltages, the second comparator supplying an output signal at the second comparator output, a control circuit connected to the buffer amplifier, to the second transistor, to the third transistor, to the first comparator, and to the second comparator, and the control circuit programmed to control the buffer amplifier, the switching transistor, the second transistor, and the third transistor and to predetermine the reference voltages dependent upon the control signals, the output signal of the first comparator,-and the output signal of the second comparator.

In accordance with an added feature of the invention, the switching transistor is a DMOS transistor.

In accordance with an additional feature of the invention, a ratio of current flowing through the switching transistor to current flowing through one of the group consisting of the second transistor and third transistor is greater than 100.

In accordance with yet another feature of the invention, the reference current source drives a reference current and the first comparator emits an output signal if a voltage drop caused across the third transistor by the reference current is greater than a voltage drop caused by current flowing through the second transistor.

In accordance with yet a further feature of the invention, the predetermined reference voltages include a first reference voltage and a second reference voltage, the switching transistor has an on state and an off state, and the second comparator emits an output signal if the first reference voltage is greater than an output voltage dropped across the switching transistor in the on state or the second reference voltage is greater than an output voltage dropped across the switching transistor in the off state.

In accordance with yet an added feature of the invention, the switching transistor is one of the group consisting of a low-side transistor and a high-side transistor.

In accordance with a concomitant feature of the invention, the switching transistor is a push-pull driver having both a low-side transistor and a high-side transistor and a switching stage is provided both for the low-side transistor and for the high-side transistor.

Other features that are considered as characteristic for the invention are set forth in the appended claims.

Although the invention is illustrated and described herein as embodied in a method and device for the open-load diagnosis of a switching stage, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 2 is a flow diagram illustrating a mode of operation of the method according to the invention.

DESCRIPTION OF THE PREFERRED EMBODIMENTS

Figure 1:
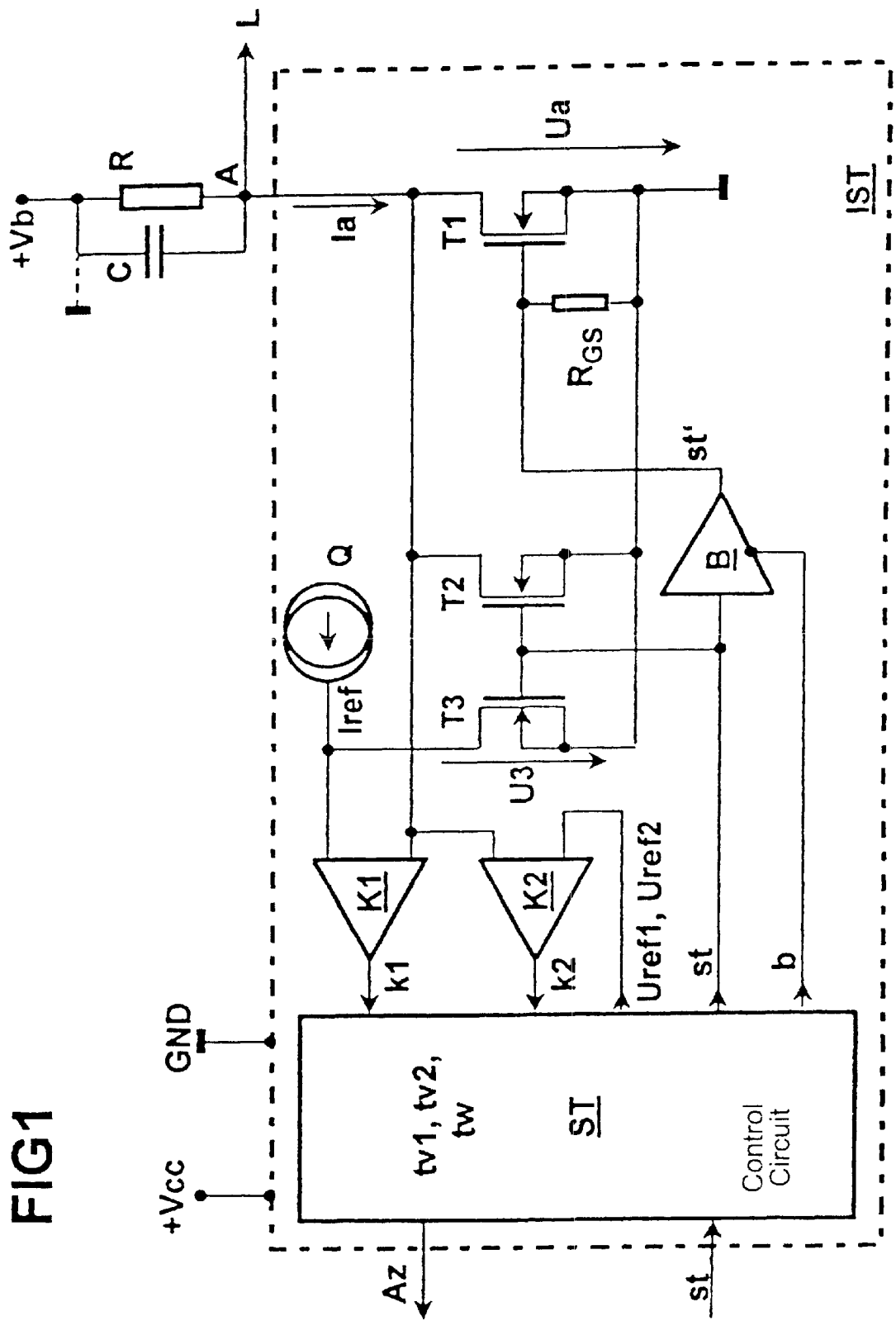
FIG. 1 is a schematic circuit diagram of an integrated driver switching stage according to the invention.

First of all, a description will be given of the invention's device for a switching stage, which will then be used to explain the method of an open-load diagnosis.

Referring now to the figures of the drawings in detail and first, particularly to FIG. 1 thereof, there is shown an integrated circuit IST (illustrated within a dash-dotted border). The integrated circuit IST is used as a so-called "intersystem driver" with a low-side switching transistor, for example, for the driving of a non-illustrated ignition coil of a motor vehicle internal combustion engine. However, the intersystem driver may also have a high-side switching transistor.

The non-illustrated output stage with the power switch, with which the ignition coil is switched on and off, is disposed as near as possible to the ignition coil. The control signals st for the ignition coil are generated depending on many parameters in a non-illustrate engine control unit and are fed to the output stage through the intersystem driver IST, hereinafter designated by "driver", which may be situated in the engine control unit, and through lines situated in a so-called "wiring harness". The configuration has the advantage that only small switching currents and voltages that generate only very small or no interference pulses flow through the wiring harness.

Output stage and ignition coil are indicated by an arrow designated by "L" in FIG. 1. The wiring harness between the output A of the driver IST and the "load" L is represented as resistor R between the output A and the positive pole +Vb of a non-illustrated vehicle battery with a capacitor C disposed in parallel with the resistor R. The capacitor C symbolizes the wiring harness capacitances. Depending on the shielding of the wiring harness, the capacitor C may also be located between the output A and the negative pole GND of the vehicle battery. Such a connection is indicated by broken lines.

The driver IST is operated from a supply voltage Vcc with the poles +Vcc and GND. The operating voltages are, for example, the battery voltage Vb=12 V and the supply voltage Vcc=5 V.

The driver IST contains a switching transistor T1 (a DMOS transistor in the exemplary embodiment, whose drain-source switching path is connected between the output A and the negative pole GND, a voltage, the output voltage Ua, being dropped across the switching path in the on state, through which voltage a current Ia, for example, 50 mA, is intended to flow in the fault-free state. A gate-source resistor Rgs is disposed between the gate and source terminals of the switching transistor T1.

Connected in parallel with the switching transistor T1 is a second transistor T2 (i.e., the drain and source terminals of T1 and T2 are respective connected to one another) of the same type as T1, but of low power, through which transistor, compared with the switching transistor T1, a significantly lower current, for example, 50 µA, is intended to flow in the on state.

Moreover, a third transistor T3, of the same type and of the same power as transistor T2, is additionally provided. The source terminals and the gate terminals of the second and third transistors T2 and T3 are respectively connected to one another.

A control circuit ST is provided within the driver IST. The control circuit ST controls the switching of the load L or the output stage thereof and the performance of the open-load diagnosis by the control signals st and two further signals k1 and k2, as will be explained later.

An output signal st—identical to the control signal st—of the control circuit is fed to the gate terminals of the second and third transistors T2 and T3 and also to the input of a buffer amplifier B that can be switched by a further output signal b of the control circuit ST. The output of the buffer amplifier B is connected to the gate terminal of the switching transistor T1.

While the second and third transistors T2 and T3 can be switched on and off directly by the output signal st of the control circuit ST, the buffer amplifier B is necessary in order, during the duration of its output signal (switching signal st', which is determined by the output signal b of the control circuit ST), to supply the significantly higher gate current of the switching transistor T1.

In addition, a first and a second comparator K1 and K2 are provided, of which one input is respectively connected to the drain terminal of the second transistor T2 and to the output of the driver IST. The drain terminal of the third transistor T3 and the second input of the first comparator K1 are connected to a reference current source Q that drives a reference current Iref through the third transistor T3. From the beginning of a control signal st, a reference voltage Uref1 is first fed to the second input of the second comparator K2. The output signals k1 and k2 of the comparators K1 and K2 pass through the outputs thereof into the control circuit ST for further treatment.

The method of an open-load diagnosis by the low-side driver IST illustrated in FIG. 1 is described below using the flow diagram illustrated in FIG. 2. Roman numerals placed in brackets refer to the function blocks designated correspondingly in FIG. 2.

In the undriven state (step I), st and st'=L and the switching transistor T1 and also the second and third transistors T2 and T3 are in an off state. If a control signal st appears (step II), then st and st'=H simultaneously. As a result, the switching transistor T1 and also the second and third transistors T2 and T3 are turned on. Thus, in the fault-free case, the capacitor C (which was discharged if, as illustrated in FIG. 2, it is connected in parallel with the resistor R) is rapidly charged and the output voltage Ua across the drain-source path of the switching transistor T1 becomes small, for example, Ua=100 mV.

Due to the duration of the process of reversing the charge of the wiring harness capacitances represented by the capacitor C, after a predetermined first delay time tv1 (step III) from the beginning of the control signal st, the control circuit ST interrogates the output signal k2 of the comparator K2, in which the output voltage Ua is compared with a first reference voltage Uref1. If the output voltage Ua is greater than Uref1 (Ua>Uref1) at such a point in time, where, for example, Uref1=50 mV, then k2=L (step IV). Thus, an open-load case is not present and the driving of the load L can proceed properly.

In such a case, the comparison of the output voltage Ua with the first reference voltage Uref1 is repeated at intervals that are determined by a predetermined waiting time tw (step IX), for as long as the control signal st lasts (step X). After the control signal st has disappeared (st and st'=L) (step XII), the three transistors T1, T2, and T3 are turned off again.

However, if Ua is less than Uref1 (Ua<Uref1), i.e., Ua<50 mV, where k2=H, then there exists an indication of an open-load.

Therefore, for safety purposes, an open-load diagnosis is carried out.

To that end, a signal b from the control circuit switches the output of the buffer amplifier B to high impedance, which results in st'=L (step V) and in the switching transistor T1 being switched off. The second and third transistors T2 and T3, driven by the control signal st, remain in the on state.

At the same time, a second delay time tv2 (step VI), which may be of the same length as the first delay time tv1, is started and a second reference voltage Uref2, for example, Uref2=400 mV, is fed to the second comparator K2 instead of the first reference voltage Uref1. The gate-source capacitance of the switching transistor T1 is discharged through the gate-source resistor Rgs. As a result, the drain-source path thereof acquires a higher impedance and the output voltage Ua across it rises.

If, during the second delay time tv2, the output voltage Ua becomes greater than the second reference voltage Uref2 (step VIa), then there is a result in k2=L and the open-load diagnosis is terminated, i.e., the buffer amplifier B is switched to low impedance again (st'=H). As a result, the switching transistor T1 is switched on again (step VIII).

If, after the second delay time tv2 (step VI) has elapsed, the output voltage Ua is less than the second reference voltage Uref2 (Ua<Uref2), then the output current Ia is subsequently compared (step VII) with the reference current Iref supplied by the reference current source Q. Because such a comparison is carried out in the comparator K1, the output voltage Ua that is dropped across the drain-source path of the second transistor T2 and is proportional to the output current Ia is compared with the voltage U3 that is dropped across the drain-source path of the third transistor T3 and is caused by the reference current Iref.

If Ia>Iref or Ua>U3 (step VII), where K1=L, then it is assumed that an open-load case is not present, and the output of the buffer amplifier B is switched to low impedance again and the switching transistor T1 is, thus, turned on (step VIII). The voltage rise at the switching transistor Ti during the open-load diagnosis is so small (~400 mV) that the load is not switched off in this time (steps V to VIII).

After the already mentioned waiting time tw (step IX), if the control signal st still exists (step X), the diagnosis operation described is repeated, beginning with the comparison of the output voltage Ua with the reference voltage Uref (IV). After the disappearance of the control signal st, and, thus, st', the three transistors T1, T2, and T3 are turned off again (step XII).

However, if Ia<Iref, i.e., Ua<U3 (step VII), where K1=H, it is then assumed that an open-load case is present. In such a case, an indication Az is effected (step XI), i.e., by way of example, an optical indication is activated or, in the context of an on-board diagnosis, an entry is made in an associated memory in the control circuit ST or in the non-illustrated engine control unit. After waiting for the waiting time tw (step IX), a renewed diagnosis is performed if the control signal st still lasts, or the switch-on operation is ended after the end of the control signal st.

When an open-load case is present, it is possible, for example, also to prevent all further switch-on operations.

According to the invention, the driver can have either a low-side switching transistor Tl, as described in the exemplary embodiment and illustrated in the drawing, or a high-side switching transistor. However, in particular, in an integrated embodiment, to be independent in terms of the application, the driver may also have a push-pull driver having both a low-side transistor and a high-side transistor. In such a case, a circuit IST (illustrated within the dash-dotted border in FIG. 1) is necessary both for the low-side switching transistor and for the high-side switching transistor.

We claim:

1. A method for an open-load diagnosis of a switching stage, which comprises:

providing a switching stage having a load connected in series with at least one switching transistor;

defining a predetermined first delay time period;

starting a count of the first delay time period upon receipt of a control signal;

waiting for the first delay time period to elapse, subsequently comparing an output voltage across the switching transistor with a predetermined first reference voltage, and:
  terminating the open-load diagnosis and maintaining a driving of the switching stage until an end of the control signal where the output voltage is greater than the predetermined first reference voltage; and
  turning off the switching transistor and starting a count for a predetermined second delay time period where the output voltage is less than the predetermined first reference voltage;
during the course of the second delay time period, comparing the output voltage with a predetermined second reference voltage, and, where the output voltage is greater than the predetermined second reference voltage:
  terminating the open-load diagnosis;
  turning on the switching transistor again; and
  maintaining the driving of the switching stage until the end of the control signal;
where the output voltage is less than the predetermined second reference voltage after the second delay time period has elapsed, comparing one of:
  an output current flowing through the switching transistor; and
  a voltage proportional to the output current
with at least one of a predetermined reference current and a voltage proportional to the predetermined reference current, and
  terminating the open-load diagnosis and maintaining the driving of the switching stage until the end of the control signal where the output current is greater than the predetermined reference current; and
  effecting an open-load indication where the output current is less than the predetermined reference current; and
repeating the open-load diagnosis from an end of the first delay time period until the end of the control signal after a predetermined waiting time period has elapsed.

2. The method according to claim 1, which further comprises activating an optical indication identifying an open-load case through an indication signal.

3. The method according to claim 2, which further comprises making an entry identifying an open-load case in a diagnosis memory as a result of the indication signal.

4. A device for diagnosing an open-load of a switching stage, comprising:
  a switchable buffer amplifier;
  a switching transistor having a drain-source path, said switching transistor to be controlled by control signals through said switchable buffer amplifier;
  a second transistor having a gate terminal, a source terminal, and a drain-source path connected in parallel with said drain-source path of said switching transistor, said second transistor to be controlled by the control signals;
  a third transistor having a gate terminal and a source terminal each connected to a respective one of said gate terminal and said source terminal of said second transistor, said third transistor to be controlled by the control signals;
  a reference current source connected to said drain terminal of said third transistor;
  a first comparator having two inputs and a first comparator output, one of said inputs connected to said drain terminal of said third transistor and another of said inputs connected to said drain terminal of said second transistor, said first comparator supplying an output signal at said first comparator output;
  a second comparator having two inputs and a second comparator output, one of said inputs connected to said drain terminal of said second transistor and another of said inputs receiving predetermined reference voltages, said second comparator supplying an output signal at said second comparator output;
  a control circuit connected to said buffer amplifier, to said second transistor, to said third transistor, to said first comparator, and to said second comparator; and
  said control circuit programmed:
    to control said buffer amplifier, said switching transistor, said second transistor, and said third transistor; and
    to predetermine the reference voltages
  dependent upon:
    the control signals;
    said output signal of said first comparator; and
    said output signal of said second comparator.

5. The device according to claim 4, wherein said switching transistor is a DMOS transistor.

6. The device according to claim 4, wherein a ratio of current flowing through said switching transistor to current flowing through one of the group consisting of said second transistor and third transistor is greater than 100.

7. The device according to claim 4, wherein:
  said reference current source drives a reference current; and
  said first comparator emits an output signal if a voltage drop caused across said third transistor by said reference current is greater than a voltage drop caused by current flowing through said second transistor.

8. The device according to claim 4, wherein
  the predetermined reference voltages include a first reference voltage and a second reference voltage;
  said switching transistor has an on state and an off state; and
  said second comparator emits an output signal if:
    the first reference voltage is greater than an output voltage dropped across said switching transistor in said on state; or
    the second reference voltage is greater than an output voltage dropped across said switching transistor in said off state.

9. The device according to claim 4, wherein said switching transistor is one of the group consisting of a low-side transistor and a high-side transistor.

10. The device according to claim 4, wherein:
  said switching transistor is a push-pull driver having both a low-side transistor and a high-side transistor; and
  a switching stage is provided both for said low-side transistor and for said high-side transistor.

11. A device for diagnosing an open-load condition of a switching stage having a load, comprising:
  a switchable buffer amplifier;
  a switching transistor having a drain-source path, said switching transistor to be controlled by control signals through said switchable buffer amplifier, said switching transistor connected in series with the load of the switching stage;
  a second transistor having a gate terminal, a source terminal, and a drain-source path connected in parallel with said drain-source path of said switching transistor, said second transistor to be controlled by the control signals;
a third transistor having a gate terminal and a source terminal each connected to a respective one of said gate terminal and said source terminal of said second transistor, said third transistor to be controlled by the control signals;
a reference current source connected to said drain terminal of said third transistor;
a first comparator having two inputs and a first comparator output, one of said inputs connected to said drain terminal of said third transistor and another of said inputs connected to said drain terminal of said second transistor, said first comparator supplying an output signal at said first comparator output;
a second comparator having two inputs and a second comparator output, one of said inputs connected to said drain terminal of said second transistor and another of said inputs receiving predetermined reference voltages including a first reference voltage and a second reference voltage, said second comparator supplying an output signal at said second comparator output;
a control circuit connected to said buffer amplifier, to said second transistor, to said third transistor, to said first comparator, and to said second comparator;
said control circuit programmed:
to control said buffer amplifier, said switching transistor, said second transistor, and said third transistor, and to predetermine the reference voltages dependent upon:
the control signals;
said output signal of said first comparator; and
said output signal of said second comparator;
to start a count of a first delay time period upon receipt of a control signal, to subsequently compare an output voltage across said switching transistor with the predetermined first reference voltage after the first delay time period has elapsed, and:
to terminate an open-load diagnosis and maintain a driving of the switching stage until an end of the control signal where the output voltage is greater than the predetermined first reference voltage;
to turn off said switching transistor and start a count for a predetermined second delay time period where the output voltage is less than the predetermined first reference voltage;
to compare the output voltage with the second reference voltage during a course of the second delay time period;
where the output voltage is greater than the second reference voltage:
to terminate the open-load diagnosis;
to turn on said switching transistor again; and
to maintain the driving of the switching stage until the end of the control signal;
to compare one of:
an output current flowing through said switching transistor; and
a voltage proportional to the output current
with at least one of a predetermined reference current and a voltage proportional to the predetermined reference current where the output voltage is less than the predetermined second reference voltage after the second delay time period has elapsed;
to terminate the open-load diagnosis and maintain the driving of the switching stage until the end of the control signal where the output current is greater than the predetermined reference current;
to effect an open-load indication where the output current is less than the predetermined reference current; and
to repeat the open-load diagnosis from an end of the first delay time period until the end of the control signal after a predetermined waiting time period has elapsed.

12. A device for diagnosing an open-load of switching stages having loads, comprising:
a first circuit for diagnosing an open-load condition of a first load of a first of the switching stages, the first circuit including:
a first switchable buffer amplifier;
a push-pull driver having a low-side transistor with a drain-source path, said low-side transistor to be controlled by control signals through said switchable buffer amplifier, said low-side transistor connected in series with the first load;
a second transistor having a gate terminal, a source terminal, and a drain-source path connected in parallel with said drain-source path of said low-side transistor, said second transistor to be controlled by the control signals;
a third transistor having a gate terminal and a source terminal each connected to a respective one of said gate terminal and said source terminal of said second transistor, said third transistor to be controlled by the control signals;
a reference current source connected to said drain terminal of said third transistor;
a first comparator having two first comparator inputs and a first comparator output, one of said first comparator inputs connected to said drain terminal of said third transistor and another of said first comparator inputs connected to said drain terminal of said second transistor, said first comparator supplying an output signal at said first comparator output;
a second comparator having two second comparator inputs and a second comparator output, one of said second comparator inputs connected to said drain terminal of said second transistor and another of said second comparator inputs receiving predetermined reference voltages, said second comparator supplying an output signal at said second comparator output;
a control circuit connected to said first buffer amplifier, to said second transistor, to said third transistor, to said first comparator, and to said second comparator; and
said control circuit programmed:
to control said first buffer amplifier, said low-side transistor, said second transistor, and said third transistor; and
to predetermine the reference voltages
dependent upon:
the control signals;
said output signal of said first comparator; and
said output signal of said second comparator; and
a second circuit for diagnosing an open-load condition of a second load of a second of the switching stages, the second circuit including:
a second switchable buffer amplifier;
said push-pull driver having a high-side transistor with a drain-source path, said high-side transistor to be controlled by control signals through said second switchable buffer amplifier, said high-side transistor connected in series with the second load;

a fourth transistor having a gate terminal, a source terminal, and a drain-source path connected in parallel with said drain-source path of said high-side transistor, said fourth transistor to be controlled by the control signals;

a fifth transistor having a gate terminal and a source terminal each connected to a respective one of said gate terminal and said source terminal of said fourth transistor, said fifth transistor to be controlled by the control signals;

a reference current source connected to said drain terminal of said fifth transistor;

a third comparator having two third comparator inputs and a third comparator output, one of said third comparator inputs connected to said drain terminal of said fifth transistor and another of said third comparator inputs connected to said drain terminal of said fourth transistor, said third comparator supplying an output signal at said third comparator output;

a fourth comparator having two fourth comparator inputs and a fourth comparator output, one of said fourth comparator inputs connected to said drain terminal of said fourth transistor and another of said fourth comparator inputs receiving predetermined reference voltages, said fourth comparator supplying an output signal at said fourth comparator output;

a control circuit connected to said second buffer amplifier, to said fourth transistor, to said fifth transistor, to said third comparator, and to said fourth comparator; and said control circuit programmed:
  to control said second buffer amplifier, said high-side transistor, said fourth transistor, and said fifth transistor; and
  to predetermine the reference voltages dependent upon:
  the control signals;
  said output signal of said third comparator; and
  said output signal of said fourth comparator.

* * * * *